(12) United States Patent
Ueda

(10) Patent No.: US 10,984,520 B2
(45) Date of Patent: Apr. 20, 2021

(54) USER INTERFACE AND MAINTENANCE GUIDANCE METHOD

(71) Applicant: Tokyo Electron Limited, Tokyo (JP)

(72) Inventor: Masanori Ueda, Yamanashi (JP)

(73) Assignee: TOKYO ELECTRON LIMITED, Tokyo (JP)

(*) Notice: Subject to any disclaimer, the term of this patent is extended or adjusted under 35 U.S.C. 154(b) by 157 days.

(21) Appl. No.: 16/022,859

(22) Filed: Jun. 29, 2018

(65) Prior Publication Data
US 2019/0019284 A1 Jan. 17, 2019

(30) Foreign Application Priority Data

Jul. 11, 2017 (JP) .............................. JP2017-135266

(51) Int. Cl.
*G06T 7/00* (2017.01)
*G06T 11/60* (2006.01)
(Continued)

(52) U.S. Cl.
CPC ........... *G06T 7/0004* (2013.01); *G06Q 10/20* (2013.01); *G06Q 50/04* (2013.01); *G06T 11/60* (2013.01); *G06T 2207/30148* (2013.01)

(58) Field of Classification Search
CPC ................... G06T 7/0004; G06T 11/60; G06T 2207/30148; G06Q 10/20; G06Q 50/04
(Continued)

(56) References Cited

U.S. PATENT DOCUMENTS

2014/0022281 A1* 1/2014 Georgeson ................ B64F 5/60
345/633
2016/0041548 A1* 2/2016 Chung ............... G05B 23/0221
700/108
(Continued)

FOREIGN PATENT DOCUMENTS

JP 2004-140241 A 5/2004
JP 2004140241 A * 5/2004 ......... G01R 31/2889
(Continued)

OTHER PUBLICATIONS

TRITOP Professional, "Precise Industrial 3D Metrology," archived on May 11, 2017, available at: < https://web.archive.org/web/20170511124803/https://www.gom.com/3d-software/gom-system-software/tritop-professional.html > (Year: 2017).*

*Primary Examiner* — Richard W. Crandall
(74) *Attorney, Agent, or Firm* — Abelman, Frayne & Schwab

(57) ABSTRACT

Disclosed is a user interface 52 including an operation screen on which prescribed information of an apparatus is displayed and which is used for predetermined operation, and an operation section which performs an operation of the operation screen. The operation screen includes a maintenance mode for performing maintenance for the apparatus. In the maintenance mode, a maintenance screen 101 corresponding to the predetermined maintenance item among a plurality of maintenance items of which maintenance operations are stored in the storage unit 53 is displayed on the operation screen. In the maintenance screen 101, the contents of maintenance of the relevant maintenance item is displayed as the screen 101 for each procedure based on the information of the storage unit 53. In each screen 101 for
(Continued)

each procedure, an image 106 illustrating the description 105 of the procedure and the maintenance location is displayed.

12 Claims, 9 Drawing Sheets

(51) Int. Cl.
*G06Q 50/04* (2012.01)
*G06Q 10/00* (2012.01)

(58) Field of Classification Search
USPC .......................................................... 705/305
See application file for complete search history.

(56) References Cited

U.S. PATENT DOCUMENTS

| | | | | |
|---|---|---|---|---|
| 2016/0173816 A1* | 6/2016 | Huenerfauth | .......... | G06Q 10/20 348/14.02 |
| 2016/0314237 A1* | 10/2016 | Luoh | .................. | G01R 31/2831 |
| 2017/0076408 A1* | 3/2017 | D'Souza | ................ | G06Q 20/10 |

FOREIGN PATENT DOCUMENTS

| | | | | | |
|---|---|---|---|---|---|
| JP | 2007-226278 | A | | 9/2007 | |
| JP | 2007226278 | A | * | 9/2007 | |
| JP | 2013-254812 | A | | 12/2013 | |
| JP | 2013254812 | A | * | 12/2013 | ......... G01R 1/07307 |
| JP | 2015-097048 | A | | 5/2015 | |
| JP | 2015097048 | A | * | 5/2015 | |
| JP | 2017-097856 | A | | 6/2017 | |
| JP | 2017097856 | A | * | 6/2017 | |

* cited by examiner

USER INTERFACE AND MAINTENANCE GUIDANCE METHOD

CROSS-REFERENCE TO RELATED APPLICATIONS

This application is based on and claims priority from Japanese Patent Application No. 2017-135266 filed on Jul. 11, 2017 with the Japan Patent Office, the disclosure of which is incorporated herein in its entirety by reference.

TECHNICAL FIELD

The present disclosure relates to a user interface and a maintenance guidance method.

BACKGROUND

In a manufacturing process of a semiconductor device, when all processes in a semiconductor wafer (hereinafter, simply referred to as a "wafer") are completed, electrical inspection of a plurality of semiconductor devices (hereinafter, simply referred to as "devices") formed on the wafer is performed. As an inspection apparatus that performs such inspection, there has been known an inspection apparatus in which a probe card having a probe needle to be brought into contact with a semiconductor device is disposed opposite to a stage (chuck top) that sucks and holds a wafer, and the probe card is pressed against the wafer on the stage, so that each contact probe of the probe card is brought into contact with an electrode of the device so as to inspect electrical characteristics (see, e.g., Japanese Laid-open Patent Publication No. 2004-140241).

On the other hand, recently, it has been demanded to perform inspection on a plurality of semiconductor wafers at a high speed, and an inspection apparatus including a plurality of inspection units, a storage container configured to store a plurality of wafers, and a transfer device configured to transfer wafers from the storage container to each inspection unit has been proposed (e.g., Japanese Laid-open Patent Publication No. 2013-254812).

Such an inspection apparatus includes, for example, a stage configured to suck a wafer, an aligner configured to perform positioning of the wafer, and a transfer device configured to transfer the wafer onto a stage. Since the structure of the inspection apparatus is complicated, regular maintenance is necessary.

Due to the complicated structure of the apparatus, the number of maintenance items in regular maintenance is enormous. When performing maintenance, maintenance operations are performed on an operation screen of the apparatus or by an operation of an actual worker while referring to procedures, photographs, and illustrations described in a huge manual covering hundreds of pages or thousands of pages.

In a case of executing one maintenance item, a plurality of operations are performed in order, among which operations performed on the operation screen and operations performed by the worker are mixed. Maintenance is not taken into account on the operation screen and necessary operation items are displayed for each component, such as the stage, the aligner, or the loader. Therefore, when performing the maintenance operations on the operation screen, it takes time to reach the screen and an operation button on which the operation is performed. Further, in the case of operations actually performed by the worker, it is necessary to look for an operation target from the inside of an apparatus in which, for example, a plurality of pipes, valves, cables, and other components are disposed complicatedly over a maintenance area with reference to an operation target location based on, for example, photographs illustrated in the manual, and to perform an operation. Therefore, it takes a lot of time. Also, in the case of the operation performed on the operation screen, it is necessary to perform the operation while seeing the real object, and it takes time to specify an operation target from the photographs in the manual, or to look for an actually desired operation target.

Technique for performing maintenance of an apparatus has been proposed in Japanese Laid-open Patent Publication No. 2015-097048. In this technique, an information code is arranged in a component to be maintained, during maintenance, the maintenance information is retrieved from the Internet by reading the information code of the maintenance target with an operation terminal and displayed on a display screen, so that effort to find maintenance information from a manual is eliminated.

SUMMARY

According to a first aspect of the present disclosure, a user interface is provided including an operation screen on which prescribed information of an apparatus is displayed and which is used for predetermined operation, and an operation section on which an operation of the operation screen is performed, in which the operation screen includes a maintenance mode for performing maintenance for the apparatus. In the maintenance mode, a maintenance screen corresponding to a predetermined maintenance item among a plurality of maintenance items of which maintenance operations are stored in the storage unit is displayed on the operation screen. In the maintenance screen, contents of maintenance of a relevant maintenance item is displayed as a screen for each procedure based on information of the storage unit. In the corresponding screen for each procedure, an image showing the description of the procedure and the maintenance location is displayed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
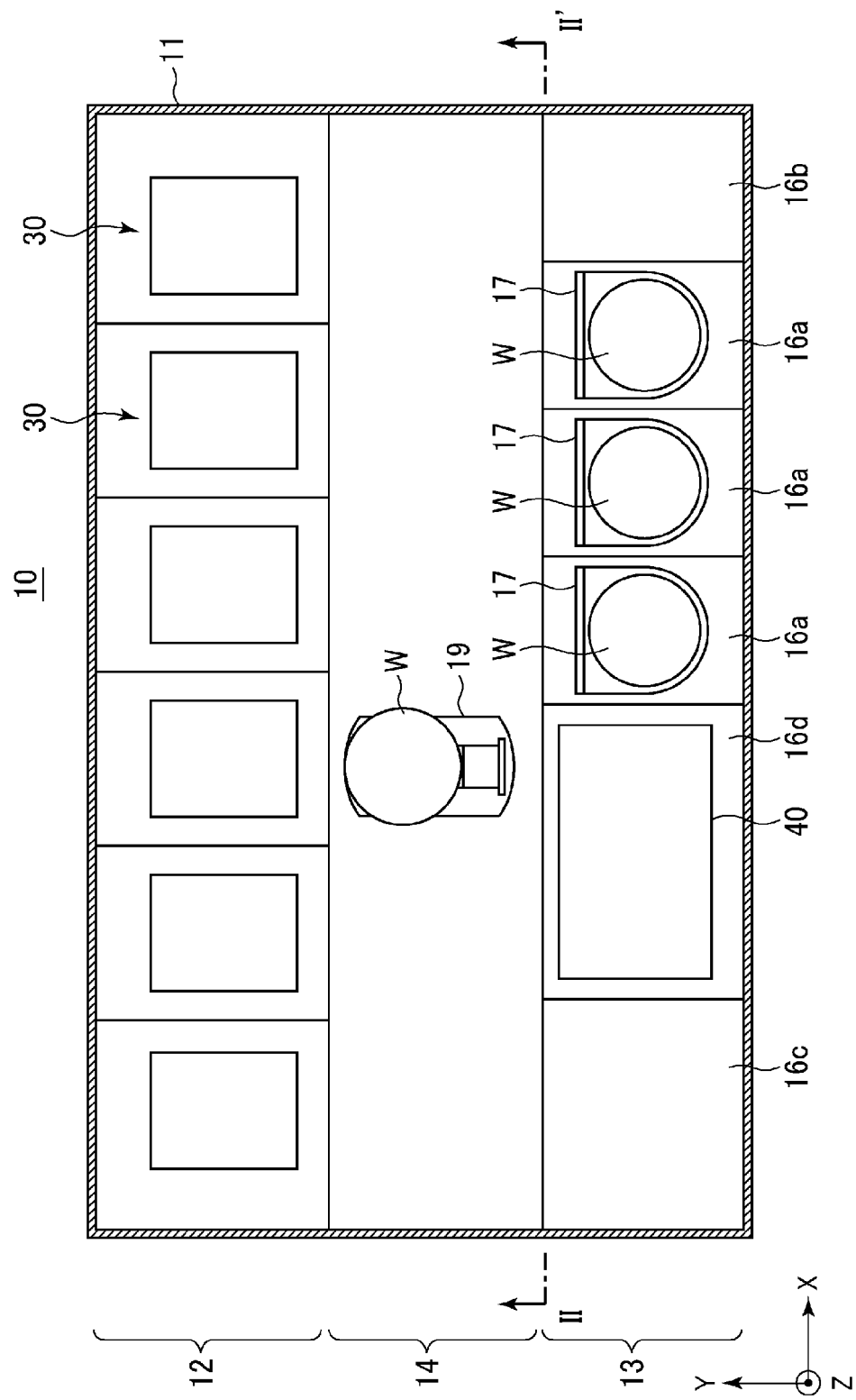
FIG. 1 is a horizontal sectional view schematically illustrating configuration of an example of an inspection apparatus.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

The technique proposed in Japanese Laid-open Patent Publication No. 2015-097048 has the effect of reducing the burden of maintenance. However, it is not possible to reduce the time for performing the maintenance operation using the operation screen, or the time for searching for the desired operation target when a worker actually performs the operation.

Therefore, the present disclosure is to provide a technique capable of reducing the apparatus maintenance time.

In order to solve the above-mentioned problem, according to a first aspect of the present disclosure, a user interface is provided including an operation screen on which prescribed information of an apparatus is displayed and which is used for predetermined operation, and an operation section on which an operation of the operation screen is performed, in which the operation screen includes a maintenance mode for performing maintenance for the apparatus. In the maintenance mode, a maintenance screen corresponding to the predetermined maintenance item among a plurality of maintenance items of which maintenance operations are stored in a storage unit is displayed on the operation screen. In the maintenance screen, contents of maintenance of a relevant maintenance item is displayed as a screen for each procedure based on information of the storage unit. In the corresponding screen for each procedure, an image showing the description of the procedure and the maintenance location is displayed.

In the first aspect, the image may be a photographed image or a 3D-CAD image of the maintenance location. Further, the maintenance operation may be displayed in the image.

The image may be operable such that the maintenance location is marked with a specific mark, or the maintenance location is displayed by flickering. The image may also be operable to be zoomed up or down, rotated, or changed in a view point. Further, the image may be operable such that the images from a predetermined reference position, for example, a position where the entire apparatus image is able to be grasped, to the maintenance location are continuously displayed.

The screen for each procedure may be sequentially displayed in an order of the procedures. In this case, the operation of the maintenance procedure includes an operation that is able to be operated on the operation screen and an operation performed by a worker. The operation that is able to be performed on the operation screen is executed by operating an executing button and when a corresponding procedure is completed, a screen for next procedure is displayed. In a case of the operation performed by a worker, a screen for the next procedure may be displayed by operating an update button when the corresponding procedure is completed.

The screen for each procedure may be configured to be able to selectively display a screen of arbitrary procedure, and to display the screen of arbitrary procedure in a reverse order.

The operation screen is a touch panel display. The operation section is configured to be able to perform the operation of the operation screen by operating a button on the operation screen.

The screen for each procedure may be configured to display an explanation related to each procedure of the maintenance manual thereon.

The apparatus may be applied as an inspection apparatus configured to perform an electrical inspection of a semiconductor wafer.

According to a second aspect of the present disclosure, a maintenance guidance method for performing maintenance guidance of an apparatus by an operation screen used for an operation of the apparatus is provided. The method includes causing, on the operation screen, a predetermined maintenance item to be displayed as a screen for each procedure, which is a maintenance screen corresponding to the predetermined maintenance item among a plurality of maintenance items of which maintenance operations are stored in a storage unit, based on the information of the storage unit, and performing the maintenance guidance by causing, on the each screen for each procedure, an image showing a description of a procedure and a maintenance location to be displayed.

According to the present disclosure, the operation screen may be set to a maintenance mode in which predetermined maintenance is able to be selected from a plurality of maintenance items. In the maintenance mode, a maintenance screen corresponding to a predetermined maintenance item among a plurality of maintenance items of which maintenance operations are stored in the storage unit is displayed. In the maintenance screen, contents of maintenance of the relevant maintenance item is displayed as a screen for each procedure based on information of the storage unit. In the corresponding screen for each procedure, an image showing the description of the procedure and the maintenance location of the procedure is displayed. Therefore, it is possible to reduce the effort to find the maintenance procedure by referring to the manual or to reach the operation on the operation screen, and also it is possible to easily grasp the maintenance location. As a result, the maintenance time of the inspection apparatus may be shortened and mean time to repair (MTTR) may be reduced as compared with the conventional case.

Hereinafter, exemplary embodiments of the present disclosure will be described with reference to the accompanying drawings.

<Outline of Overall Configuration of Inspection Apparatus>

First, an outline of overall configuration of an inspection apparatus to which a user interface according to the present disclosure is applied will be described.

Figure 2:
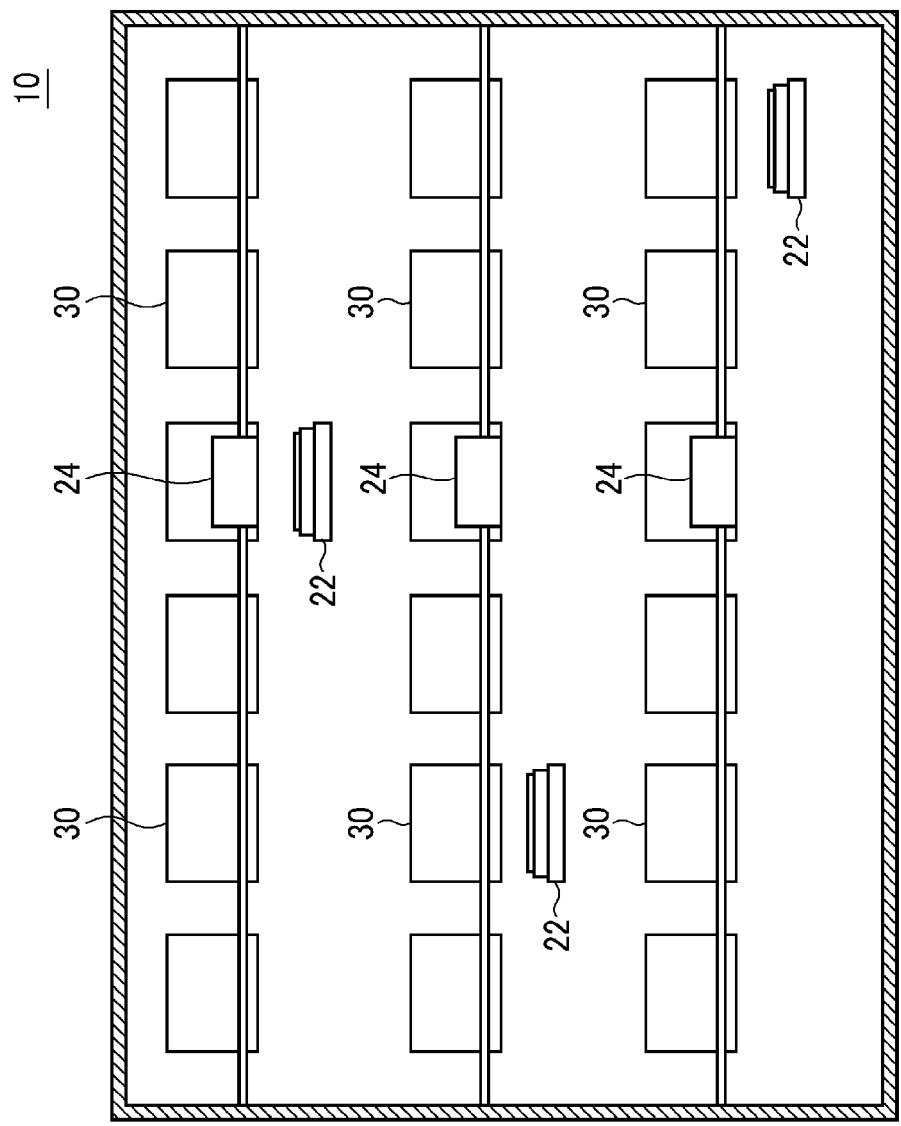
FIG. 2 is a cross-sectional view taken along the line II-II' of the inspection apparatus of FIG. 1.

FIG. 1 is a horizontal sectional view schematically illustrating a configuration of an example of an inspection apparatus and FIG. 2 is a cross-sectional view taken along line II-II' of the inspection apparatus of FIG. 1. The inspection apparatus 10 of the exemplary embodiment is configured to inspect the electrical characteristics of a plurality of devices formed on a wafer which is a target to be inspected.

In FIG. 1, the inspection apparatus 10 includes a case 11 and includes, inside the case 11, an inspection area 12 configured to perform inspection of the electrical characteristics of a semiconductor device of a wafer W, a loading/unloading area 13 configured to perform loading/unloading of the wafer W or a probe card and including a control system, and a transfer area 14 provided between the inspection area 12 and the loading/unloading area 13.

As illustrated in FIG. 2, in the inspection area 12, a plurality of (6 in the drawing) inspection units (probers) 30 in which a tester for wafer inspection is incorporated are arranged along the X direction. Rows of such inspection units are arranged in three stages in the Z direction (vertical direction). For each stage, one aligner (stage) 22, which is movable in the X direction with respect to the inspection units 30 arranged in the X direction, is provided below the inspection units 30. Further, in each stage of the inspection area 12, one alignment camera 24 is provided to be movable in a portion in the transfer area 14 rather than in the inspection units 30 along the X direction.

The loading/unloading area 13 is partitioned into a plurality of ports and includes a plurality of wafer loading/unloading ports 16a configured to accommodate a FOUP 17 which is a container for accommodating a plurality of wafers W therein, a prealignment portion 16b configured to perform positioning of a wafer to be transferred, a probe card loader 16c configured to load and unload a probe card, and a control port 16d including a controller 40 configured to control the action of each component of the inspection apparatus 10.

A movable transfer mechanism 19 is disposed in the transfer area 14. The transfer mechanism 19 receives wafers W from the wafer loading/unloading ports 16a in the loading/unloading area 13 and transfers the wafers to chuck tops (stages) each configured to suck and hold a wafer in each of the inspection units 30 of all the stages, and transfers a wafer W on which the inspection of electrical characteristics of devices has been completed from the chuck top of the corresponding inspection unit 30 to a wafer loading/unloading port 16a. Further, the transfer mechanism 19 transfers a probe card that requires maintenance from each inspection unit 30 to the probe card loader 16c, and also transfers a new probe card or a probe card on which the maintenance has been completed to each inspection unit 30.

Figure 3:
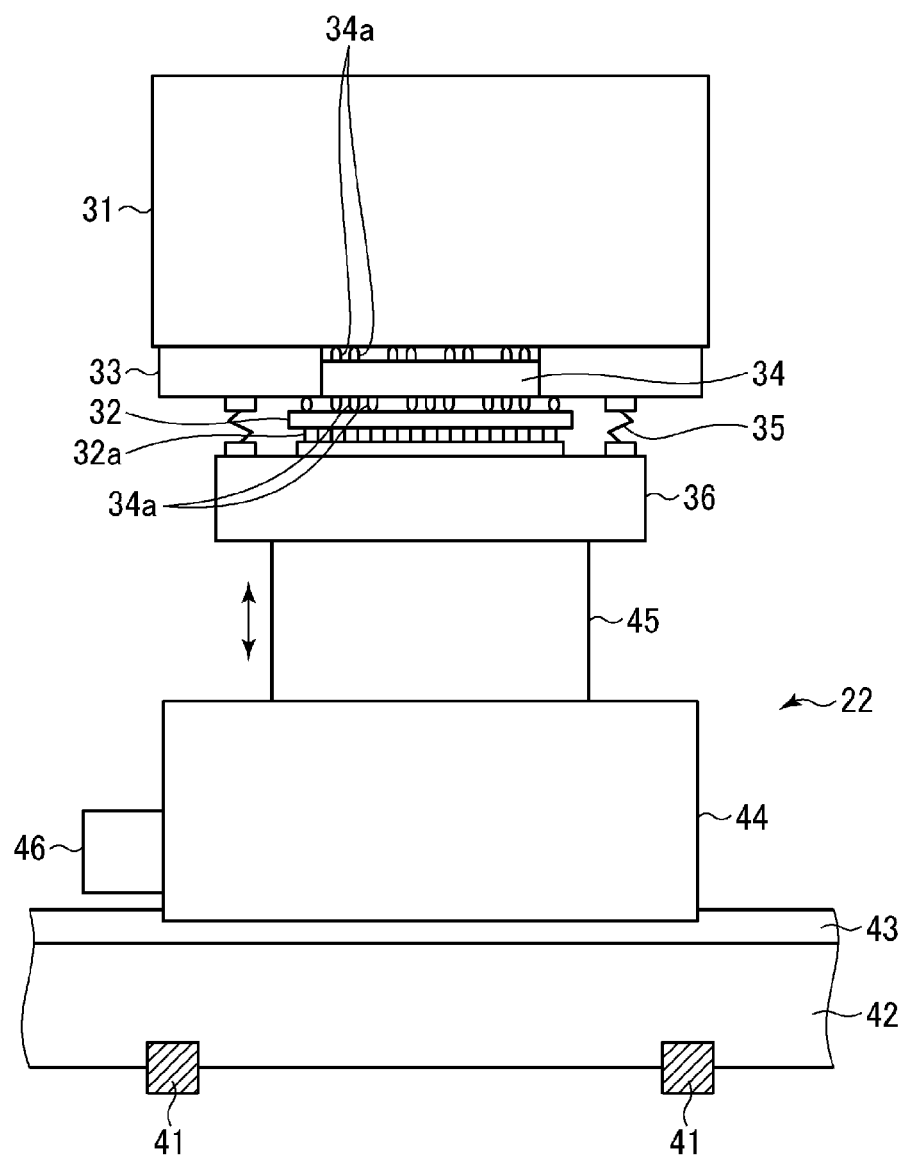
FIG. 3 is a view illustrating schematic configuration of an inspection unit in an inspection apparatus.

FIG. 3 is a view illustrating a schematic configuration of an inspection unit 30. The inspection unit 30 includes a tester 31 configured to send an inspection signal to a device formed on a wafer W, a probe card 32 including a plurality of probes 32a configured to be brought into contact with electrodes of a plurality of devices formed on the wafer W, a support plate 33 provided below the tester 31 and configured to support a probe card 32, a contact block 34 configured to connect the tester 31 and the probe card 32 to each other, a bellows installed to hang from the support plate 33 and surround the probe card 32, and a chuck top (stage) 36 configured to suck and hold the wafer W by vacuum suction and adjust the temperature of the wafer W. On the upper and lower surfaces of the contact block 34, a plurality of pogo pins configured to electrically connect the probe card 32 and the tester 31 are provided. The bellows 35 is configured to form a sealed space including the probe card 32 and the wafer W in the state where the wafer W on the chuck top 36 is in contact with the plurality of probes 32a of the probe card 32. The chuck top 36 is sucked to the support plate 33 by evacuating the sealed space through a vacuum line. Also, the probe card 32 is similarly sucked to the support plate 33 by evacuating.

The aligner 22 includes an X block 42 configured to move in the X direction on guide rails 41 provided on the base plate of the corresponding stage, a Y block 44 configured to move on guide rails 43 provided on the X block 42 along the Y direction, and a Z block 45 configured to move in the Z direction with respect to the Y block 44. The chuck top 36 is coupled to the Z block 45 in the state of maintaining a predetermined positional relationship. Further, on the peripheral wall of the Y block 44, a lower camera 46 is provided so as to photograph the lower surface of the probe card 32.

The aligner 22 is able to move in the X direction and access just under each inspection unit 30. The aligner 22 includes a moving mechanism configured to move the chuck top on which a wafer W is placed in the X, Y, and Z directions so as to perform, for example, positioning of the wafer W which is a target to be inspected with respect to each inspection unit 30, mounting of the wafer W onto the chuck top 36 to the probe card 32, and removing of the wafer W on the chuck top 36 from the probe card 32.

When the wafer W is transferred to the chuck top 36 and mounted on the probe card 32, the wafer is received by the chuck top 36 from the transfer mechanism, positioning of the wafer W is performed with respect to the probe card 32. Subsequently, the chuck top 36 is raised by the aligner 22 so as to bring the wafer W into contact with the probes 32a of the probe card 32, and then the chuck top 36 is raised again so as to press the wafer W against the probes 32a. In this state, the space surrounded by the bellows 35 is evacuated to cause the chuck top 36 to be sucked to the support plate 33, and the wafer is maintained in the state of being pressed against the probes 32a. In this state, an electrical inspection by the tester 31 is started. At this time, the Z block 45 of the aligner 22 is retreated downward, and the aligner 22 is moved to another inspection unit 30 after the inspection is completed. By an action reverse to the above-described action, the chuck top 36 after the inspection is lowered and the wafer W after the inspection on the chuck top 36 is returned to the FOUP 17 by the transfer mechanism 19.

Figure 4:
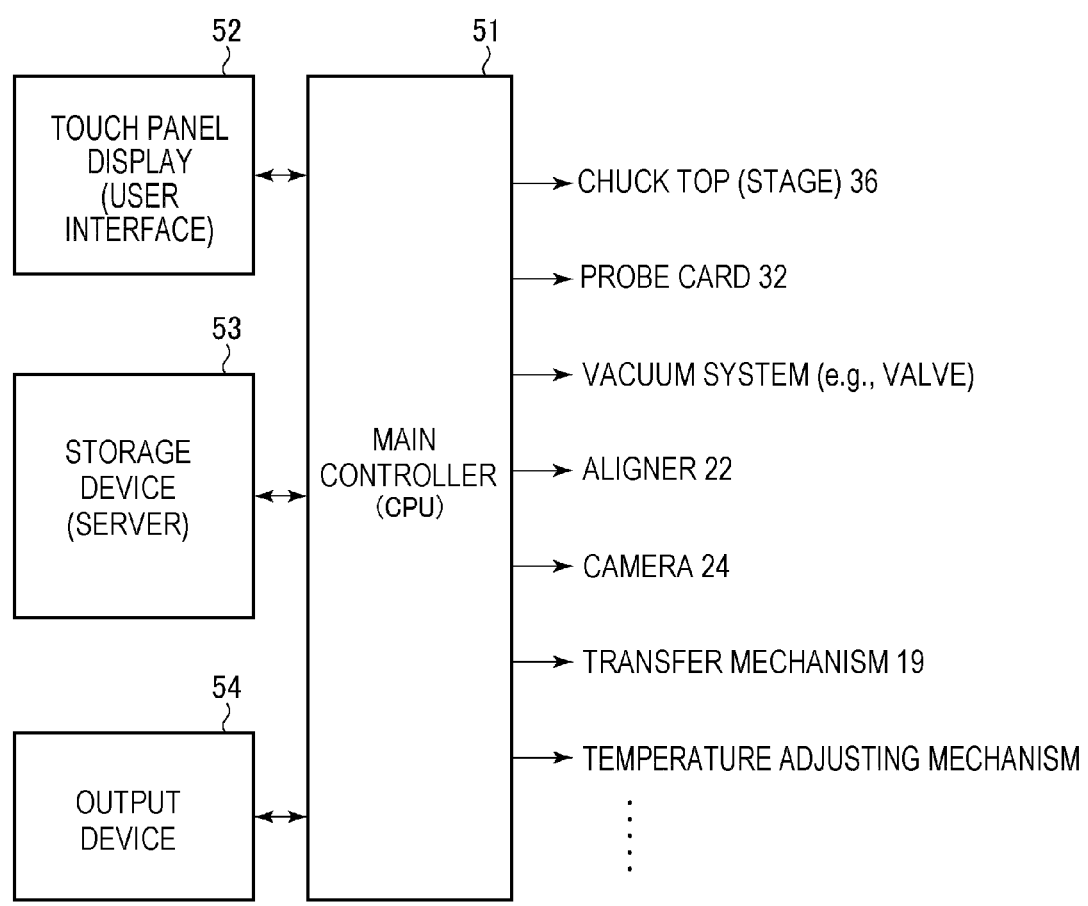
FIG. 4 is a block diagram illustrating a controller including a user interface in an inspection apparatus.

As illustrated in FIG. 4, the controller 40 includes a main controller 51 configured to control each component constituting the inspection apparatus 10, a touch panel display 52 as a user interface, a storage device (server) 53 configured to store information therein, and an output device 54 configured to output information.

The main controller 51 includes a CPU and controls, for example, the chuck top 36 of each inspection unit 30, the probe card 32, a vacuum system (e.g., a valve) used for sucking the wafer W or the like, the aligner 22, the camera 24, the transfer mechanism 19, and a temperature adjusting mechanism in the chuck top 36.

The storage device (server) 53 incorporates a storage medium such as a hard disk, and data necessary for control is stored in the storage medium. Further, the storage device 53 is configured to set a portable storage medium stored with data for control (e.g., a CD, a DVD or a flash memory) therein. In the storage medium, a recipe for performing control of the action of the inspection apparatus or other data for performing the operation of the inspection apparatus are stored. Further, data necessary for performing normal apparatus maintenance is stored for each maintenance item. The normal maintenance may be, for example, oil-feeding to an LM guide in the Z axis of the aligner.

The touch panel display 52 as a user interface includes both an operation screen on which prescribed information of the inspection apparatus 10 is displayed and which is used for a predetermined operation and an operation unit used for operating the operation screen. The touch panel display 52 is configured to select a normal mode used when the inspection apparatus 10 performs a normal action and a maintenance mode used only for apparatus maintenance.

In the normal mode, for each component of the inspection apparatus 10, an operation screen is capable of being displayed for executing a predetermined operation under various statuses, so that it is possible to perform necessary operations on the screen.

When the maintenance mode is selected, a maintenance item selection screen for selecting a desired maintenance item from a plurality of maintenance items stored in the storage device 53 is displayed and a desired maintenance item is selected from the screen. When the desired maintenance item is selected, a maintenance screen of the selected item is displayed on the touch panel display 52 based on the information stored in the storage device 53.

Figure 5:
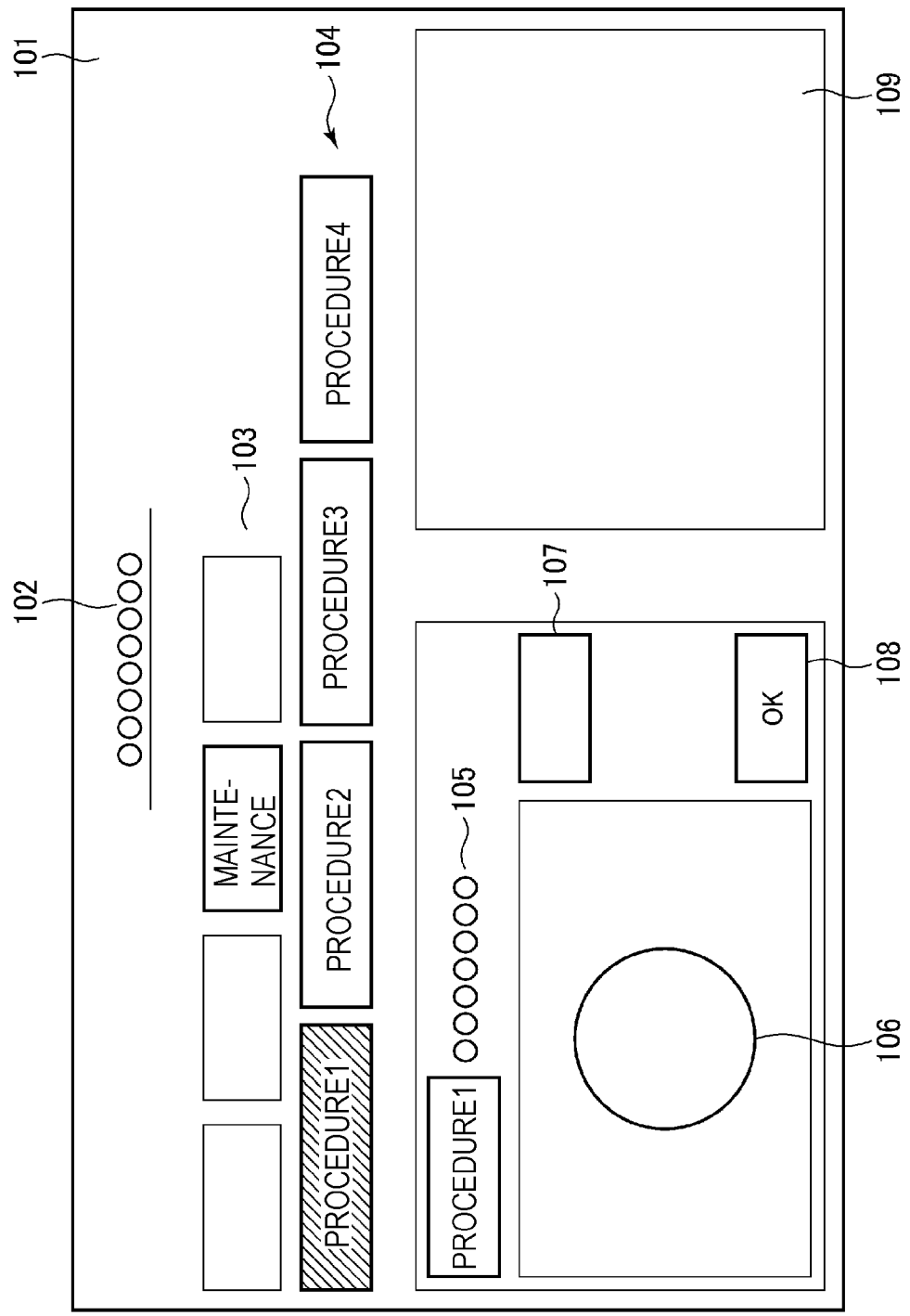
FIG. 5 is a view illustrating a maintenance screen of a touch panel display which is a user interface.

As illustrated in FIG. 5, a maintenance screen 101 includes an apparatus status display 102, a display 103 indicating that a maintenance mode is selected, a procedure display 104 indicating which procedure of maintenance is being performed, a guidance display 105 for an operation of the procedure, an image 106 showing a maintenance location, an image operation section 107, an OK button (execution and update button) 108, and other information display section 109.

The guidance display 105 briefly illustrates a procedure of the maintenance, the contents of which may be grasped by seeing the guidance display. Detailed information described in the manual may be displayed. Further, the image 106 is an image showing a location where maintenance is performed and a maintenance procedure. The image at this time may be a photographed image (picture) or a 3D-CAD image. Further, the image at this time may be configured such that the maintenance location can be marked with a specific mark or can be displayed by flickering, so that the maintenance location and procedure can be easily grasped. Further, the image may be made to be zoomed up or down, rotated, or changed in a view point, or may be made to continuously display images from a predetermined reference position (e.g., a position where the entire apparatus image is able to be grasped) to the maintenance location, so that the maintenance can be easily grasped. The image operation at this time may be performed using the image operation section 107. When the operation of the procedure is capable of being performed on the screen, the operation of the procedure is performed by pressing the OK button 108. In this case, while the operation is being executed, the maintenance location of the actual apparatus is confirmed based on the information of the image 106. The OK button 108 may cause the screen to be updated to a screen for the next procedure by being pressed again after the completion of the operation. Further, when the operation of the procedure is a manual operation by a worker, the worker performs the operation at the actual maintenance location based on the information of the image 106, and when the operation is completed, the OK button 108 is pressed, and then the screen is updated to the screen of the next procedure.

Further, on the maintenance screen, by performing a predetermined operation, it is possible to select a screen of an arbitrary procedure or to display the screen in a reverse order.

In the inspection apparatus 10 configured as described above, an electrical inspection is performed in a state where a wafer W is brought into contact with the probes 32*a* of the probe card 32 and the chuck top 36 is sucked to the support plate 33 by mounting the wafer W on the chuck top 36 supported by the aligner 22 of a predetermined inspection unit 30 from a FOUP 17 in a wafer loading/unloading port 16*a* by the transfer mechanism 19, and raising the chuck top 36 by the aligner 22. In the inspection unit 30 in which the electrical inspection is completed, the action, the suction of the chuck top on which the wafer W is mounted is released, the chuck top 36 is lowered by the aligner 22, and the wafer is returned to the FOUP 17 of the wafer loading/unloading port 16*a* by the transfer mechanism 19. The above-mentioned operations are continuously performed on the wafers W accommodated in the FOUPs 17 simultaneously and in parallel.

<Maintenance Operation>

In such an inspection apparatus 10, maintenance (normal maintenance) is regularly performed after the above described inspection is repeated.

In normal maintenance, the touch panel display 52 which is a user interface is set in the maintenance mode and a desired maintenance item is selected from the displayed maintenance items. As a result, a maintenance screen 101 of the selected item is displayed on the touch panel display 52 based on the information stored in the storage device (server) 53.

As illustrated in FIG. 5 described above, the maintenance screen 101 is set to display a guidance display 105 for each maintenance procedure, and FIG. 5 illustrated the state of procedure 1 is illustrated. The maintenance procedure is briefly displayed in the guidance display 105, and the contents of the procedure may be grasped by seeing the guidance display. Further, by displaying detailed information described in the manual, it is possible to grasp detailed contents of the procedure. At this time, since the location where the maintenance is performed and the maintenance procedure are indicated in the image 106, it becomes easier to understand the maintenance location and procedure. Further, by using a photographed image (picture) or a 3D-CAD image as the image at this time to, it is possible to grasp the maintenance location and procedure more accurately. In addition, by marking the maintenance location with a specific mark or displaying the maintenance location by flickering in the image at this time so as to make it possible to grasp the maintenance location and procedure, or by enabling zoom-up or zoom-down, rotation, view point change of the image or an operation of sequentially displaying images from a predetermined reference position (e.g., a position where the entire apparatus image can be grasped) to the maintenance location, it is possible to grasp the maintenance location more easily.

When the operation of the procedure is possible on the screen, the operation of the procedure is executed by pressing the OK button 108. At this time, while the operation (action) is being executed, the operation is confirmed at the maintenance location of the actual apparatus based on the information of the image 106.

Further, when the operation of the procedure is a manual operation by the worker, based on the information of the image 106, the worker performs the operation at the actual maintenance location, and presses the OK button 108 when the operation is completed.

When the procedure is operable on the screen, the screen display is updated to the screen of the next procedure after completion of the operation. When the operation of the procedure is a manual operation by a worker, the screen display is updated to the screen of the next procedure by pressing the OK button 108 when the operation is completed. In addition, when the procedure is operable on the screen, the screen display is updated to the screen of the next procedure by pressing the OK button 108 again.

Also in the next procedure, confirmation of the screen operation or work of the operation is performed based on the information of the guidance display 105 and the image 106 as the same manner. By repeating this until the final procedure, one maintenance is completed.

By performing the above operations on required maintenance items, the maintenance operation is completed.

Next, with reference to FIGS. 6 to 9, an actual example of such a maintenance operation will be described. Here, grease application to an LM guide of Z axis of an aligner will be described as an example.

Figure 6:
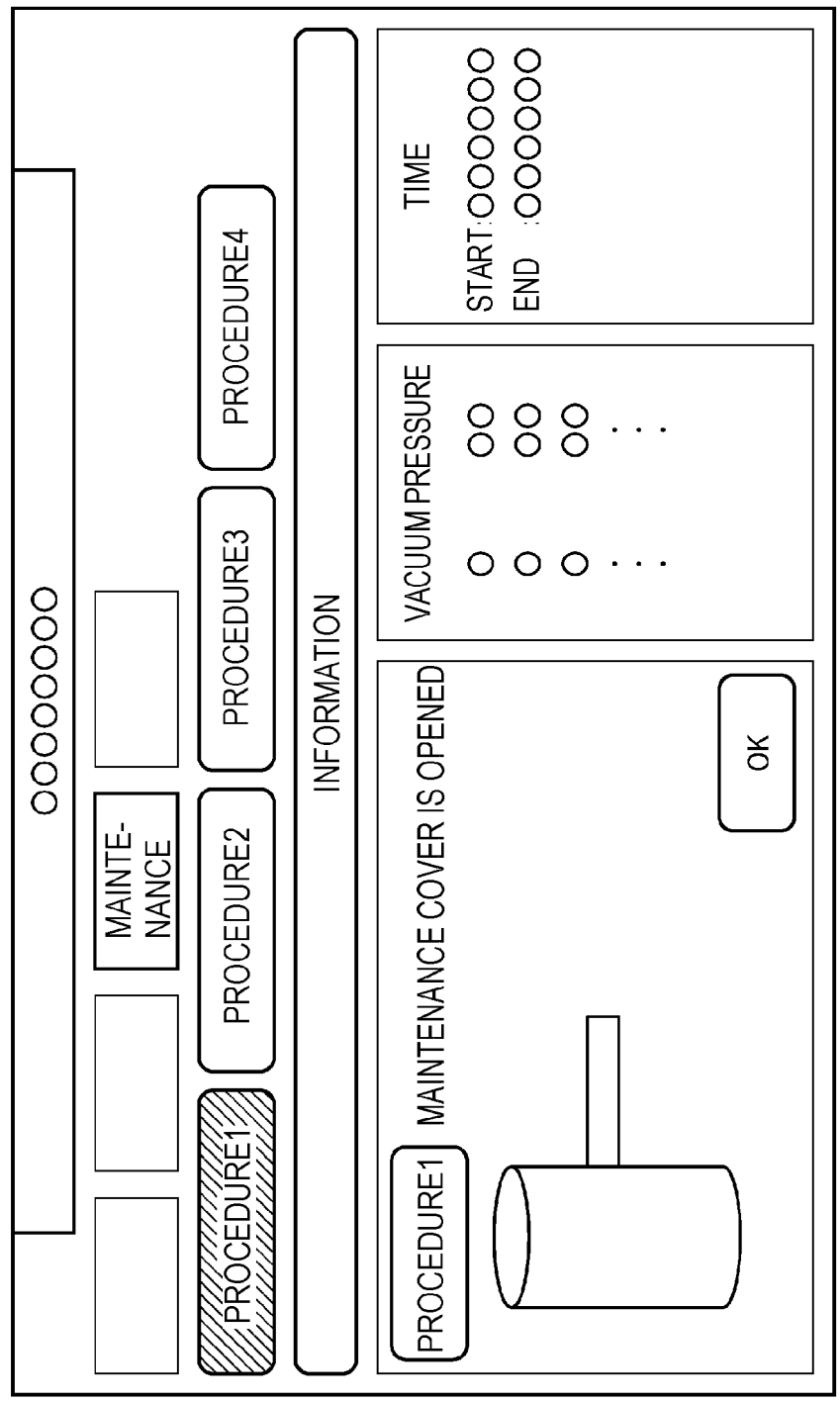
FIG. 6 is a view illustrating a procedure 1 in an actual example of a maintenance operation of a maintenance screen of a touch panel display which is a user interface.

When this maintenance item is selected, a maintenance screen showing the procedure of the selected maintenance item is displayed. As an initial screen, as illustrated in FIG. 6, a screen of "Procedure 1" which is the first procedure is displayed. On the screen of "Procedure 1", information "Maintenance Cover is Opened" is displayed, and an image showing a state in which the cover is opened is displayed. Also, as other information, various pieces of vacuum pressure information, start time/end time, and, if possible, server transmission management information are displayed. At this time, the alarm of the apparatus is canceled, and the worker turns to the back of the device and opens the maintenance cover according to the information of on the screen of "Procedure 1". Then, the worker presses the OK button.

Figure 7:
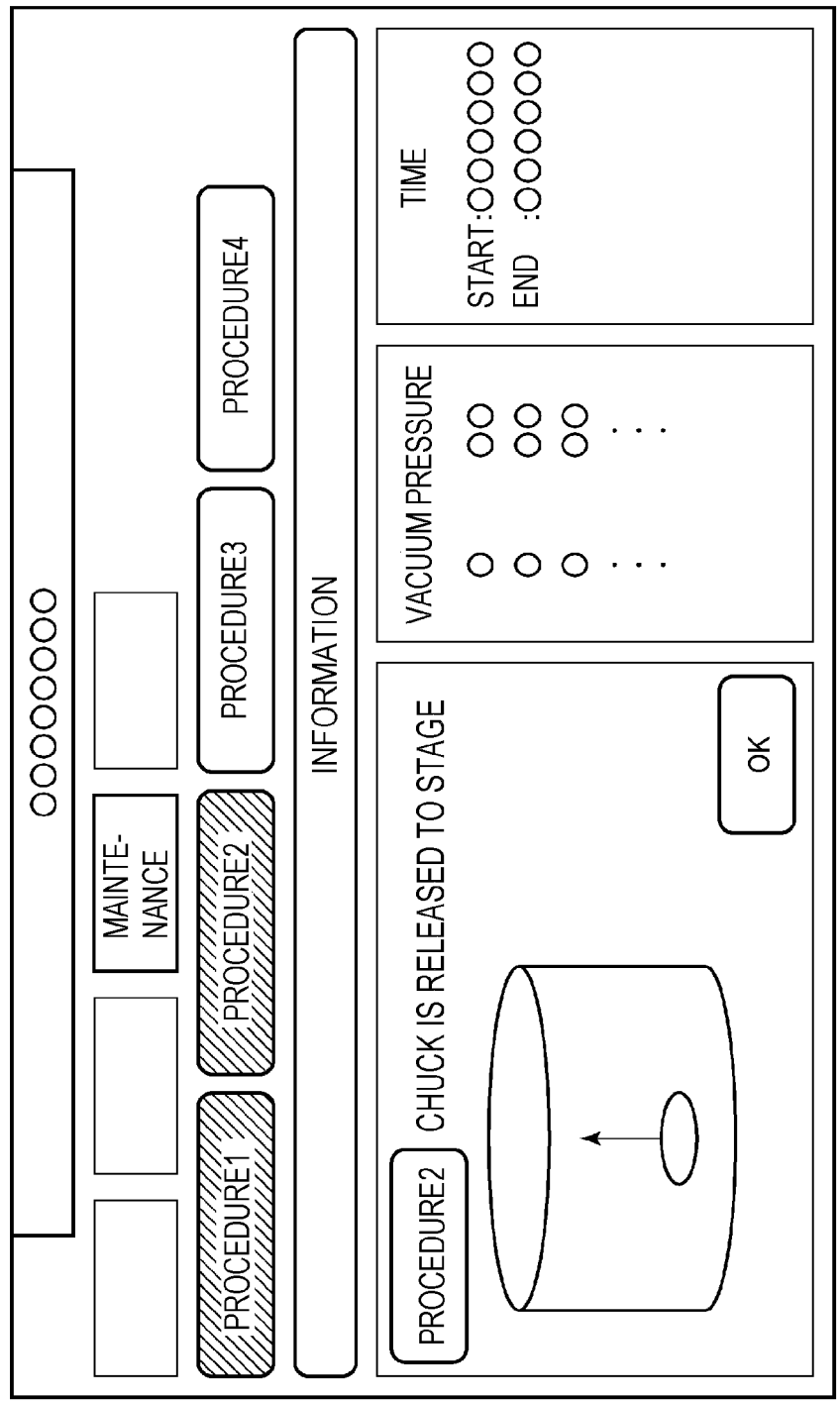
FIG. 7 is a view illustrating a procedure 2 in an actual example of a maintenance operation of a maintenance screen of a touch panel display which is a user interface.

When the OK button is pressed, the screen is updated a screen of "Procedure 2" is displayed as illustrated in FIG. 7. In the screen of "Procedure 2", information "Chuck is Released To Stage" is displayed. "Chuck" is a chuck top and "Stage" is an aligner. At this time, the screen displays a target unit as an image and displays what will happen with the operation of this procedure is displayed by, for example, flickering. Since this procedure may be performed automatically from the screen, the chuck top 36 is automatically moved and released by pressing the OK button. At this time, the worker confirms visually whether this action is normally performed or not. Further, in this action, various pieces of vacuum pressure information displayed are changed.

Figure 8:
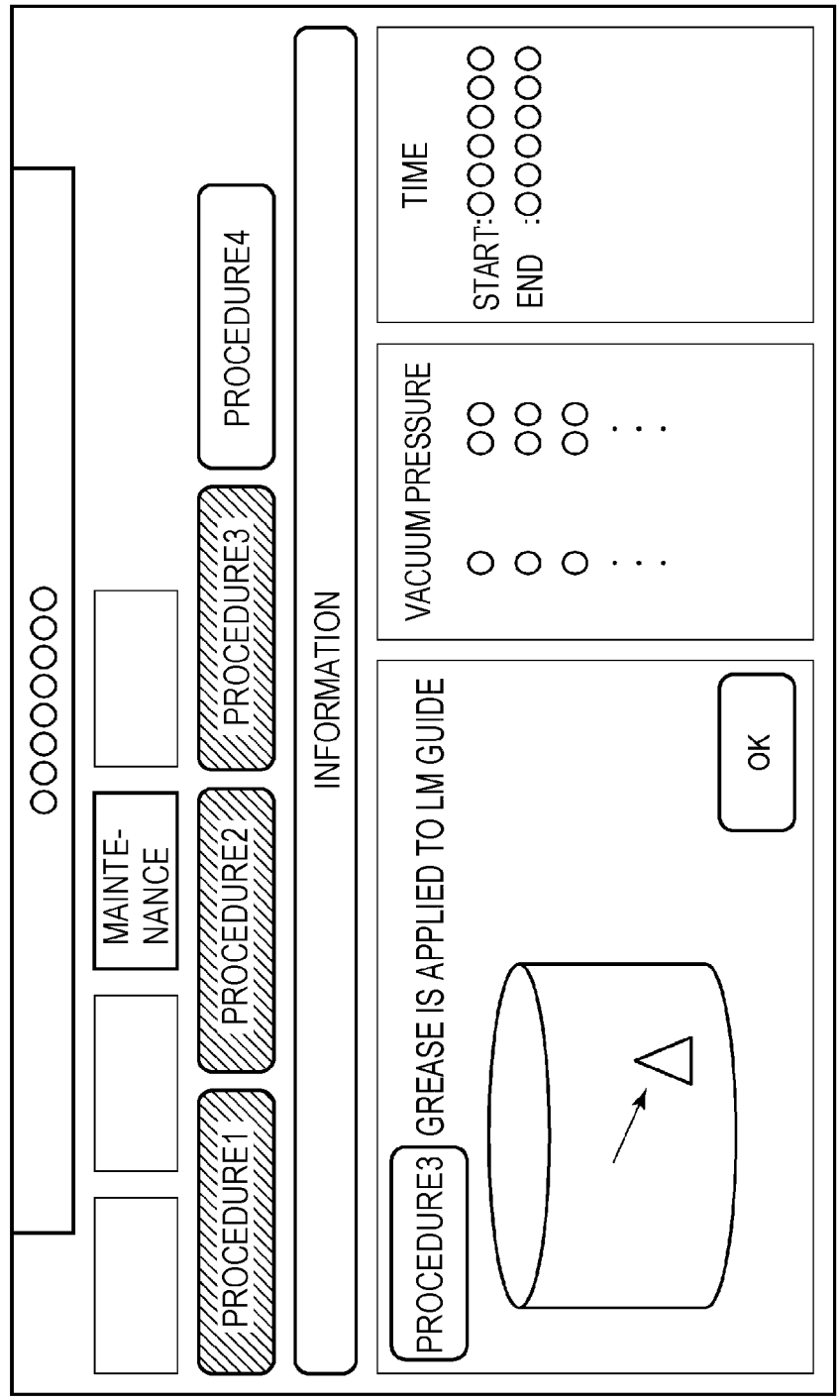
FIG. 8 is a view illustrating a procedure 3 in an actual example of a maintenance operation of a maintenance screen of a touch panel display which is a user interface.

When the OK button is pressed again after Procedure 2 is completed, a screen of "Procedure 3" is displayed as illustrated in FIG. 8. On the screen of the "Procedure 3", information "Grease is Applied To LM Guide" is displayed. At this time, in order to grasp the maintenance position clearly, the image is rotated or zoomed by a predetermined operation. The worker performs the operation of applying the grease to a maintenance target, and presses the OK button when applied.

Figure 9:
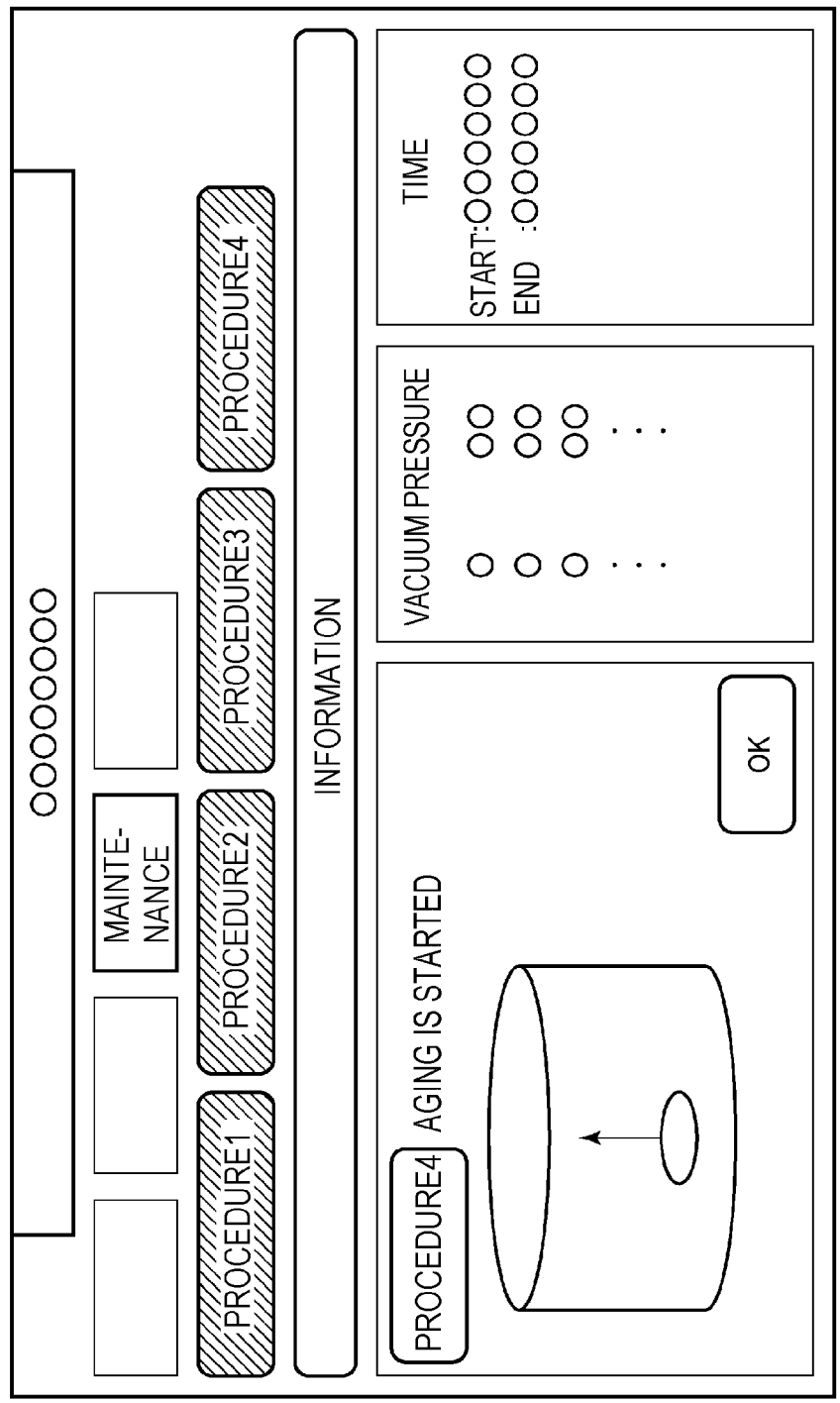
FIG. 9 is a view illustrating a procedure 4 in an actual example of a maintenance operation of a maintenance screen of a touch panel display which is a user interface.

On the screen of "Procedure 3", when the OK button is pressed, the screen is updated and a screen of "Procedure 4" is displayed as illustrated in FIG. 9. On the screen of the "Procedure 4", information "Aging is Started" is displayed. At this time, the screen displays a target unit as an image, and displays what will happen with the operation of this procedure by, for example, flickering. This procedure is an operation of spreading the grease and may be performed automatically on the screen. Therefore, the procedure is automatically executed by pressing the OK button. At this time, the worker confirms visually whether this action is normally performed or not.

By the above procedure, the application of grease to the LM guide of Z axis of the aligner which is one of the maintenance items is completed.

As described above, in the exemplary embodiment, the touch panel display 52 which is an operation screen may be set to a maintenance mode in which predetermined maintenance is selectable from a plurality of maintenance items. In the maintenance mode, a maintenance screen corresponding to a predetermined maintenance item is displayed by selecting the predetermined maintenance item. The maintenance screen is the contents of maintenance of the relevant maintenance item are displayed as a screen for each procedure based on the information of the storage unit 53 and, at each procedure, an image by which the maintenance location and operation in the procedure may be displayed. Therefore, it is possible to reduce the effort to find the maintenance procedure by referring to the manual or to reach the operation on an operation screen, and also it is possible to easily grasp the maintenance location. As a result, the maintenance time of the inspection apparatus may be shortened and a mean time to repair (MTTR) may be reduced compared with the conventional case.

Further, by using a photographed image (picture) or a 3D-CAD image as an image for each maintenance procedure, it is possible to grasp the maintenance location and procedure more easily. In addition, by the image with a specific mark, or by displaying flickering, it becomes easy to confirm the action in that procedure. Further, it may be easier to grasp the maintenance location or maintenance operation or action, for example, by performing zoom-up or zoom-down, rotation, view point change of the image displayed on the screen, or by sequentially displaying images from a predetermined reference position (e.g., a position where the entire apparatus image may be grasped) to the maintenance location.

<Other Applications>

For example, in the above exemplary embodiment, the descriptions has been made of a case where the present disclosure is applied to an inspection apparatus including a plurality of inspection units, but the present disclosure is not limited thereto, and may be applied to a single inspection apparatus. Further, the present disclosure is not limited to an inspection apparatus, but is applicable to an apparatus in which a plurality of maintenance items are exist.

In the above exemplary embodiment, a case where a touch panel display is used as a user interface is illustrated, but a display indicator may be operable by an input unit such as a keyboard or a mouse.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A user interface comprising:
a display configured to display information of a substrate processing apparatus which is used for a predetermined processing operation and to display a maintenance mode for performing maintenance for the substrate processing apparatus; and
a controller configured to control an overall operation of the display, wherein, in the maintenance mode, the controller is configured to:
display a plurality of maintenance items simultaneously in the form of a plurality of graphical user interfaces,
upon selection of a desired maintenance item from among the plurality of maintenance items by a user manually selecting a first graphical user interface, sequentially display a plurality of procedures corresponding to the selected maintenance item, and an associated image describing a relevant procedure and a maintenance location of the relevant procedure, the procedures being configured to be executed by an automatic operation and a manual operation, and wherein the automatic operation is performed by operating an executing button comprising a second graphical user interface, such that a corresponding procedure displayed on the display is automatically completed by the controller and a screen for a next procedure is displayed after the corresponding procedure is completed, wherein the user interface is further configured to receive, in the manual operation, a manual input by the user via an update button comprising a third graphical user interface that signifies that the user has completed a corresponding procedure displayed on the display, and to allow a next procedure to be displayed, wherein the displayed information of the substrate processing apparatus includes a plurality of inspection units in which a tester for wafer inspection is incorporated that are arranged along a horizontal direction, and rows of the plurality of inspection units that are arranged in a vertical direction as multiple stages, and wherein the plurality of inspection units are configured to inspect the plurality of maintenance items, respectively.

2. The user interface of claim 1, wherein the image associated with the relevant procedure is a photographed image or a 3D-CAD image of the maintenance location.

3. The user interface of claim 1, wherein a maintenance operation is displayed in the image associated with the relevant procedure.

4. The user interface of claim 1, wherein the image associated with the relevant procedure is operable such that the maintenance location is marked with a specific mark, or the maintenance location is displayed by flickering.

5. The user interface of claim 1, wherein the image associated with the relevant procedure is operable to be zoomed in or out, rotated, or changed in a view point.

6. The user interface of claim 1, wherein the image associated with the relevant procedure is operable such that images from a predetermined reference position to a maintenance location are continuously displayed.

7. The user interface of claim 1, wherein each procedure is sequentially displayed on the display in an order of procedures.

8. The user interface of claim 1, wherein the display is configured to selectively display an arbitrary procedure, and to display the procedures in a reverse order.

9. The user interface of claim 1, wherein the display is a touch panel display.

10. The user interface of claim 1, wherein, each procedure displayed on the display is configured to display an explanation related to each procedure of a maintenance manual thereon.

11. The user interface of claim 1, wherein the substrate processing Apparatus is an inspection apparatus configured to perform an electrical inspection of a semiconductor wafer.

12. A maintenance guidance method comprising:

providing a display configured to display information of a substrate processing apparatus which is used for a predetermined processing operation and to display a maintenance mode for performing maintenance for the substrate processing apparatus;

in the maintenance mode, displaying a plurality of maintenance items simultaneously in the form of a plurality of graphical user interfaces;

upon selection of a desired maintenance item from among the plurality of maintenance items by a user manually selecting a first graphical user interface, sequentially displaying a a plurality of procedures corresponding to the selected maintenance item, and an associated image describing a relevant procedure and a maintenance location of the relevant procedure, the procedures being configured to be executed by an automatic operation and a manual operation; and wherein the automatic operation is performed by operating an executing button comprising a second graphical user interface, such that a corresponding procedure displayed on the display is automatically completed and a screen for a next procedure is displayed after the corresponding procedure is completed, wherein the user interface is further configured to receive, in the manual operation, a manual input by the user via an update button comprising a third graphical user interface that signifies that the user has completed a corresponding procedure displayed on the display, and to allow a next procedure to be displayed, wherein the displayed information of the substrate processing apparatus includes a plurality of inspection units in which a tester for wafer inspection is incorporated that are arranged along a horizontal direction, and rows of the plurality of inspection units that are arranged in a vertical direction as multiple stages, and wherein the plurality of inspection units are configured to inspect the plurality of maintenance items, respectively.

* * * * *